Sept. 4, 1928.
F. A. BYLES
1,683,161
REGULATING SYSTEM
Filed March 10, 1927
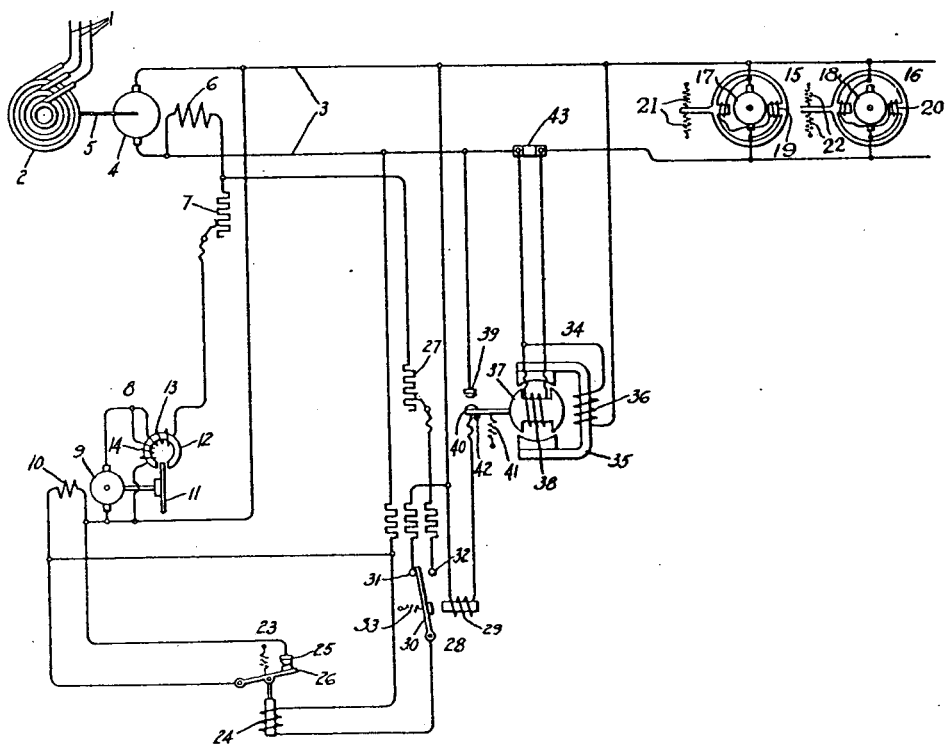
Inventor:
Frank A. Byles,
by *Alexander F. Lund*
His Attorney.

Patented Sept. 4, 1928.

1,683,161

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

REGULATING SYSTEM.

Application filed March 10, 1927. Serial No. 174,381.

My invention relates to regulating systems and more particularly to regulating systems for dynamo-electric machines which are operated at times as generators and at other times as motors.

When a dynamo-electric machine is utilized in an electrical system in which it is desirable to operate the machine either as a generator or a motor, depending upon predetermined conditions, it is desirable to maintain constant a different electrical or operating characteristic of the machine for different conditions of operation.

An object of my invention is to provide an improved system of regulation whereby a predetermined characteristic may be automatically selected and maintained constant, depending upon the operating function of the dynamo-electric machine.

For purposes of illustration, I have shown my invention as applied to a motor generator set operated in connection with electric dynamometers. The range of applications of the electric dynamometer is extremely wide, and includes a diversity of services particularly in connection with internal combustion engines where it is used for example in making engine tests and investigations of carburetors, valves, pistons and lubrication. These various tests require operation of the dynamometer either as a driving element or motor, or as an absorption element in which the dynamometer is operated as a generator and arranged to feed back into a supply circuit. It will be apparent, however, that my invention is not limited to this particular application of a motor generator set operating in connection with electric dynamometers but is equally applicable to any system in which the translating device supplied by the motor generator set may be operated as a motor or as a generator.

My invention will be better understood from the following description taken in connection with the accompanying drawing, and its scope will be pointed out in the appended claims.

Referring to the drawing in which the single figure diagrammatically illustrates one embodiment of my invention, 1 indicates an alternating current circuit connected to a dynamo-electric machine 2, and 3 indicates a direct current circuit connected to a dynamo-electric machine 4. The dynamo-electric machines 2 and 4 constitute a motor generator set, and are connected to rotate together by means of a suitable mechanical coupling indicated by the shaft 5. The dynamo-electric machine 4 is provided with field winding 6 which is connected across the direct current circuit 3 with an adjustable regulating resistance 7 connected in series therewith.

A counter-electromotive force regulator 8 of the type shown and described in Letters Patent No. 1,365,566, granted to Louis W. Thompson on January 11, 1921, is utilized to regulate dynamo-electric machine 4. The regulator 8, as shown, comprises a motor 9, the armature of which is provided with a field winding 10, which is connected across the circuit 3. In order to prevent excessive variations in the speed of motor 9 and give greater stability of rotation, a suitable brake 11 is provided therefor. As shown, the brake is of the magnetic drag type comprising a magnetic core 12 around which is positioned windings 13 and 14 and between the poles of which is the disk 11 of conducting material which is connected to the armature of motor 9 so as to rotate therewith. The winding 13 is connected in series with the armature of motor 9 and the winding 14 is connected across the armature of the motor so that the braking effect of the brake varies with the current through the motor and the counter-electromotive force of the motor.

The particular characteristic of the dynamo-electric machine 4 which is maintained constant depends upon whether the machine is operating as a motor or as a generator. In the particular embodiment shown, the circuit 3 is connected to translating devices 15 and 16 which have been diagrammatically illustrated to represent electric dynamometers comprising, respectively, rotating members 17 and 18, and relatively stationary floating members 19 and 20 which are restrained from revolving by springs or scales 21 and 22 which are utilized to indicate the torque developed by the dynamometer as a motor or delivered to it by a prime mover when the dynamometer is operated as a generator. The particular structure and arrangement of the translating devices 15 and 16 is not material to an understanding of the invention, and, since the operation and use of these devices is well known in the art, it is believed no further description is necessary.

The counter-electromotive force regulator 8 is controlled by a vibrating relay 23 which comprises an operating coil 24 and cooperating contacts 25 and 26 which are connected in a shunt circuit around the field winding 10 of the regulator motor and rapidly opened or closed in accordance with the energization of coil 24. The energization of coil 24 is dependent upon the operating function of the dynamo-electric machine 4. When dynamo-electric machine 4 is operating as a generator, coil 24 is connected to be responsive to the voltage of circuit 3 and operates to maintain constant voltage, and, when the dynamo-electric machine 4 is operating as a motor, the coil is connected to be responsive to the voltage impressed upon field winding 6 and operates to maintain constant field voltage. In the latter case, an adjustable resistance 27 is connected in series with coil 24 in order to predetermine the field voltage that will be maintained.

In order to control automatically the energization of coil 24, I provide a relay 28 comprising an operating coil 29 and a movable contact member 30 operated thereby and arranged to cooperate with stationary contacts 31 and 32. Contact member 30 is biased toward contact 31 by a spring 33. Coil 29 is connected across the circuit 3 and is energized or deenergized depending upon the operation of a directional relay 34 which for purposes of illustration is shown as a relay of the dynamometer type, although any suitable type of current or power directional relay may be used. Relay 34 is shown as comprising a definitely polarized portion such as a field member 35 provided with an energizing winding 36 between the poles of which an armature 37 is pivotally mounted. The armature 37 is provided with an energizing winding 38 and is arranged to control relatively movable cooperating contacts 39 and 40 connected in series with the circuit of the operating coil of relay 28. The contact 39 is shown as the stationary contact and the contact 40 is mounted for movement by the armature 37. The armature 37 is biased to contact opening position by the spring 41 against a stop 42. The winding 38 is connected to be energized in accordance with the current in the circuit 3 by being connected directly in series therewith or as shown by being connected to a shunt 43 which is connected in series with circuit 3. The armature is arranged to move and hold the contact 40 against the stop 42 with the current in one direction and thereby open the energizing circuit of the operating coil of relay 28, and is arranged to move contact 40 into engagement with contact 39 against the bias of spring 41 to complete the energizing circuit of relay 28 with current in the opposite direction.

The operation of the illustrated embodiment is as follows: Assume that the dynamo-electric machine 2 is energized from the circuit 1 and operating as a motor to operate dynamo-electric machine 4 as a generator, which, in turn, is driving the translating devices 15 and 16 as motors. Under these assumptions the direction of current flow or power flow will be in such a direction that relay 34 maintains its contacts 39 and 40 out of engagement to interrupt thereby the energizing circuit of the operating coil of relay 28. The contact member 30 of relay 28 will then assume the position shown and will close an energizing circuit for coil 24 of the vibrating relay 23 from the circuit 3. In other words, coil 24 is now connected to be responsive to the voltage of machine 4 operating as a generator. The contacts 25 and 26 of relay 23 are adjusted initially to open at a predetermined normal voltage and the field rheostat 7 is adjusted to hold a voltage somewhat above the predetermined normal value without the regulator. When the dynamo-electric machine 4 builds up, the voltage impressed upon the regulator 8 causes its armature to rotate rapidly since the high voltage causes the contacts 25 and 26 to open, putting maximum excitation on the field winding 10 of regulator 8. The counter-electromotive force generated by the motor opposes the field current in field winding 6 and at once lowers the generated voltage of dynamo-electric machine 4. When the voltage falls a predetermined amount, the contacts 25 and 26 close, short-circuiting the field winding 10 and thereby lowering the counter-electromotive force to permit the field current of winding 6 to increase. This causes the voltage of dynamo-electric machine 4 to rise again slightly and the same cycle is repeated. The contact action of relay 23 is so rapid that an average field excitation is held on the counter-electromotive force motor.

Now, assume the translating devices 15 and 16 are operated as generators such as would be the case if an internal combustion engine is put under test in a well known manner and arranged to drive the devices 15 and 16 as generators so that the energy delivered there to can be returned to the supply circuit 1. Under these assumptions, the direction of current flow would be in the reverse direction so that dynamo-electric machine 2 will operate as a generator to feed back energy to the circuit 1. With a reversal of current flow, relay 34 is arranged to move contact 40 into engagement with contact 39 whereby operating coil 29 of relay 28 is energized from circuit 3 and moves its contact member 30 into engagement with contact 32. This operation of relay 28 places coil 24 of vibrating relay 23 across the field winding 6 of dynamo-electric machine 4. The adjustable resistance 27 is adjusted initially so that for inverted operation the relay 23 will tend to hold such a voltage across the field winding 6 as to maintain satisfactory operation under the usual conditions of operation when feeding back into the supply circuit 1. Under these conditions the counter-electromotive force regulator 8 operates in a manner similar to that previously described to maintain constant the excitation voltage of field winding 6 and the amount of feed back to the supply system can be controlled by the operator at the dynamometer.

While I have shown and described a particular embodiment of my invention, it will be apparent to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a dynamo-electric machine adapted to operate as a generator or as a motor, regulating means adapted for controlling a plurality of predetermined electrical characteristics of said machine, and means responsive to an electrical characteristic of said dynamo-electric machine for automatically controlling said regulating means to govern one of said predetermined electrical characteristics when said dynamo-electric machine operates as a generator and to govern a different one of said predetermined electrical characteristics when said dynamo-electric machine operates as a motor.

2. In combination, a dynamo-electric machine adapted to operate as a generator or as a motor, a regulator for maintaining substantially constant a predetermined electrical characteristic of said dynamo-electric machine when operating as a generator, and a directional relay for controlling the operation of said regulator to maintain substantially constant a different predetermined electrical characteristic of said dynamo-electric machine when operating as a motor.

3. In combination, a dynamo-electric machine adapted to operate as a generator or as a motor, a regulator for maintaining substantially constant the voltage of said dynamo-electric machine when operated as a generator, a relay connected to be responsive to the direction of the current traversing said dynamo-electric machine for controlling the operation of said regulator to maintain substantially constant the field voltage of said dynamo-electric machine when operating as a motor.

4. In combination, a supply circuit, an electrical unit comprising two mechanically coupled machines one of which is connected to said supply circuit, said electrical unit being adapted to receive or deliver electrical energy to said supply circuit, a regulator for maintaining substantially constant the voltage of one of said dynamo-electric machines when operated to deliver electrical energy, and means for automatically modifying the operation of said regulator to maintain constant the field voltage of said one of said dynamo-electric machines when operated to deliver electrical energy to said supply circuit.

5. In a system of distribution, a dynamo-electric machine, a second dynamo-electric machine, a circuit interconnecting said dynamo-electric machines, said second dynamo-electric machine being adapted to receive or deliver electrical energy to said first-mentioned dynamo-electric machine, a regulator comprising an operating coil for controlling said first-mentioned dynamo-electric machine, and means responsive to the direction of energy flow of said first-mentioned dynamo-electric machine for controlling the connection of said operating coil for maintaining substantially constant the terminal voltage of said first-mentioned dynamo-electric machine when operating as a generator and for maintaining substantially constant the field voltage of said first-mentioned dynamo-electric machine when operating as a motor.

6. In a regulating system for controlling a predetermined electrical characteristic of a dynamo-electric machine wherein the desired regulation is effected by varying the excitation of a regulating dynamo, a vibratory device for controlling the excitation of said regulating dynamo comprising a winding responsive to the condition being regulated, switching means comprising a relay for changing the connection of said winding to said dynamo-electric machine, and a directional relay for controlling said switching means in accordance with the direction of current traversing said dynamo-electric machine.

7. In a regulating system, a dynamo-electric machine, a field winding for said dynamo-electric machine, a counter-electromotive force machine having its armature connected in series with said field winding, a field winding for said counter-electromotive force machine connected to be energized from said dynamo-electric machine, a vibratory device having an operating winding for controlling the energization of the field winding of said counter-electromotive force machine, switching means adapted for connecting said operating winding to be responsive to the voltage of said dynamo-electric machine and adapted for connecting said operating winding to be responsive to the voltage of the field circuit of said dynamo-electric machine, a current directional relay for moving said switching means to its first-mentioned circuit connecting position when said dynamo-electric machine is operated as a generator and for moving said switching means to its second circuit connecting position when said dynamo-electric machine is operated as a motor.

In witness whereof, I have hereunto set my hand this 8th day of March, 1927.

FRANK A. BYLES.